(12) United States Patent
Izumi et al.

(10) Patent No.: US 9,449,437 B2
(45) Date of Patent: Sep. 20, 2016

(54) METHOD OF DIAGNOSING OPERATING CHARACTERISTICS

(71) Applicant: Hitachi, Ltd., Tokyo (JP)

(72) Inventors: Yoshifumi Izumi, Tokyo (JP); Noboru Kiyama, Tokyo (JP); Tsuneo Sobue, Tokyo (JP); Toshimitsu Takahashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/594,696

(22) Filed: Jan. 12, 2015

(65) Prior Publication Data

US 2015/0279128 A1   Oct. 1, 2015

(30) Foreign Application Priority Data

Mar. 25, 2014   (JP) .................. 2014-061446

(51) Int. Cl.
| | |
|---|---|
| G07C 5/08 | (2006.01) |
| G06Q 10/06 | (2012.01) |
| G06Q 10/00 | (2012.01) |
| G06Q 40/08 | (2012.01) |
| G06F 17/30 | (2006.01) |
| H04L 29/08 | (2006.01) |
| G08G 1/017 | (2006.01) |

(Continued)

(52) U.S. Cl.
CPC ....... *G07C 5/0808* (2013.01); *G06F 17/30598* (2013.01); *G06Q 10/0639* (2013.01); *G06Q 10/20* (2013.01); *G06Q 40/08* (2013.01); *H04L 67/12* (2013.01); *G06G 7/76* (2013.01); *G06Q 40/00* (2013.01); *G06Q 40/02* (2013.01); *G08G 1/017* (2013.01); *G08G 1/164* (2013.01)

(58) Field of Classification Search
CPC .... G07C 5/08; G07C 5/0808; G07C 5/0841; G01C 21/34; B60W 50/0097; G06Q 40/00; G06Q 40/02; G06Q 40/08; G06Q 10/20; G06G 7/76; G08G 1/017; G08G 1/164; G08G 1/16; G08G 1/167; G06K 9/00; G06K 9/00791; H04L 67/12; G06F 17/30
See application file for complete search history.

(56) References Cited

U.S. PATENT DOCUMENTS

| | | | | |
|---|---|---|---|---|
| 7,116,077 | B2 * | 10/2006 | Raftari | B60K 6/445 318/767 |
| 8,577,703 | B2 * | 11/2013 | McClellan | G06Q 40/02 705/7.11 |

(Continued)

FOREIGN PATENT DOCUMENTS

| | | |
|---|---|---|
| EP | 1403826 A1 | 3/2004 |
| JP | 4995046 B2 | 5/2012 |

(Continued)

OTHER PUBLICATIONS

European Office Action, European Patent Application No. 15151041.9, Jul. 23, 2015, 7 pages.

*Primary Examiner* — Behrang Badii
(74) *Attorney, Agent, or Firm* — Volpe and Koenig, P.C.

(57) ABSTRACT

A method of diagnosing operating characteristics of a vehicle by a server device includes: obtaining operating characteristics information relative to the operating characteristics of the vehicle; and diagnosing the operating characteristics of the vehicle based upon feature information relative to a feature of a driver of the vehicle registered in advance in the server device and the operating characteristics information obtained from the vehicle.

6 Claims, 12 Drawing Sheets

(51) Int. Cl.
  *G06Q 40/02*  (2012.01)
  *G08G 1/16*  (2006.01)
  *G06G 7/76*  (2006.01)
  *G06Q 40/00*  (2012.01)

(56) References Cited

U.S. PATENT DOCUMENTS

2004/0103719 A1* 6/2004 Raftari ............... B60K 6/445
                                                  73/114.61
2006/0155439 A1* 7/2006 Slawinski ........... G07C 5/0858
                                                  701/33.4
2007/0282519 A1* 12/2007 Emam .................. G08G 1/017
                                                  701/117
2009/0024419 A1* 1/2009 McClellan ............ G06Q 40/02
                                                  705/4
2015/0206360 A1* 7/2015 Schnurr ............ B60W 50/0097
                                                  701/29.1

FOREIGN PATENT DOCUMENTS

WO    2006130146 A1   12/2006
WO    2014028377 A2   2/2014
WO    2014031723 A2   2/2014

* cited by examiner

USER REGISTRATION QUESTIONNAIRE

Yes   No

- ARE YOU GOOD AT DRIVING CAR?  ☐    ☐
                                               61    65
- ARE YOU LIVING IN THE CURRENT
  AREA FOR 3 OR MORE YEARS?     ☐    ☐
                                            62    66
  ·  · · · · · · · · · · · · · · · · · · · · · · · · ☐    ☐
                                            63    67
  ·  · · · · · · · · · · · · · · · · · · · · · · · · ☐    ☐
                                          64    68

[END] — 69

BEGINNERS

FIG.7B

EXPERTS

FIG.7C

AGED PERSONS

ND OF DIAGNOSING OPERATING
METHOD OF DIAGNOSING OPERATING CHARACTERISTICS

INCORPORATION BY REFERENCE

The disclosure of the following priority application is herein incorporated by reference: Japanese Patent Application No. 2014-061446 filed on Mar. 25, 2014.

BACKGROUND OF THE INVENTION

1. Field of the Invention

The present invention relates to a method of diagnosing operating characteristics of a vehicle.

2. Description of Related Art

A conventional technology for calculating an auto insurance price in correspondence to operating characteristics of a driver involves obtaining the operation state or condition of a vehicle based upon driving operations of the driver and calculating a risk index for use in deciding the level of safe driving for the driver based upon the obtained driving state or condition as described in Japanese Patent No. 4995046.

SUMMARY OF THE INVENTION

According to the technology described in Japanese Patent No. 4995046, an average value and a standard deviate of risk indices for all the insurance contractors of an insurance are compared with a risk index calculated for a particular driver who is a target of calculation of the insurance price and an assessment about the operating characteristics of the particular driver is decided. Based on this assessment, the insurance price for the particular driver is calculated. However, such a method does not enable assessment of the operating characteristics and calculation of insurance prices, with appropriately reflecting a feature of the driver which tends to be difficult to be expressed in the risk index.

According to the technology described in Japanese Patent No. 4995046, the insurance price is calculated in correspondence to the assessment of the operating characteristics based on the level of safe driving decided for an individual driver. However, typically, auto insurance is applied by vehicle but not by individual driver. Accordingly, in the case in which a single vehicle is shared by a plurality of persons in a family or in some other cases, it is impossible to calculate the insurance price appropriately since the operating characteristics of the vehicle cannot be diagnosed taking into consideration the operating characteristics of each of the drivers who drive the vehicle.

The present invention has been achieved to solve the problem of the conventional technology as described above. A main object of the present invention is to achieve the diagnosis of the operating characteristics of a vehicle in which a feature of each of the drivers who drives the vehicle is reflected.

A method of diagnosing operating characteristics of a vehicle by a server device according to a first aspect of the present invention includes: obtaining operating characteristics information relative to the operating characteristics of the vehicle; and diagnosing the operating characteristics of the vehicle based upon feature information relative to a feature of a driver of the vehicle registered in advance in the server device and the operating characteristics information obtained from the vehicle.

According to a second aspect of the present invention, in the method of diagnosing operating characteristics of the first aspect, it is preferred that the server device: classifies the driver into one of a plurality of categories based upon the feature information; sets an operating characteristics curve corresponding to the classified category of the driver; corrects the set operating characteristics curve based upon the feature information and the operating characteristics information; and diagnoses the operating characteristics of the vehicle based upon the corrected operating characteristics curve.

According to a third aspect of the present invention, in the method of diagnosing operating characteristics of the first or second aspect, the vehicle may be shared by a plurality of drivers, and it is preferred that the server device: diagnoses the operating characteristics of the vehicle for each of the drivers; and diagnoses the operating characteristics of the vehicle based upon a result of the diagnosis of the operating characteristics of each of the drivers.

According to a fourth aspect of the present invention, in the method of diagnosing operating characteristics of the second aspect, the vehicle may be shared by a plurality of drivers, and it is preferred that the server device: classifies each of the drivers into any one of the plurality of the categories based upon the feature information of each of the drivers of the vehicle; sets an operating characteristics curve corresponding to the classified category of each of the drivers for each of the drivers; corrects the set operating characteristics curve of each of the drivers based upon the feature information and the operating characteristics information of each of the drivers; and diagnoses the operating characteristics of the vehicle based upon the corrected operating characteristics curve of each of the drivers.

According to a fifth aspect of the present invention, in the method of diagnosing operating characteristics of any one of the first through fourth aspects, it is preferred that the feature information includes at least one of a plurality of pieces of information about attribute, driving career, resident area and duration of residence of the driver, and the operating characteristics information includes at least one of a plurality of pieces of information about a driving tendency of the driver, a condition or state of the vehicle and a traveling position of the vehicle.

According to a sixth aspect of the present invention, in the method of diagnosing operating characteristics of any one of the first through fifth aspects, the driver may be determined based upon a captured image of the driver or the operating characteristics information.

According to a seventh aspect of the present invention, in the method of diagnosing operating characteristics of any one of the first through sixth aspects, it is preferred that the result of diagnosis of the operating characteristics of the vehicle is presented to the driver.

According to an eighth aspect of the present invention, in the method of diagnosing operating characteristics according to the fourth aspect, it is preferred that the corrected operating characteristics curve of each of the drivers and the result of diagnosis of the operating characteristics of the vehicle are presented to each of the drivers.

A method of diagnosing, by a server device, operating characteristics of a vehicle shared by a plurality of drivers according to a ninth aspect of the present invention includes; diagnosing operating characteristics relative to each of the drivers of the vehicle, and diagnosing the operating characteristics of the vehicle based upon a result of the diagnosis of the operating characteristics of each of the drivers.

According to the present invention, it is possible to achieve the diagnosis of the operating characteristics of a vehicle in which a feature of each of the drivers who drives the vehicle is reflected.

DESCRIPTION OF EMBODIMENTS

Figure 1:
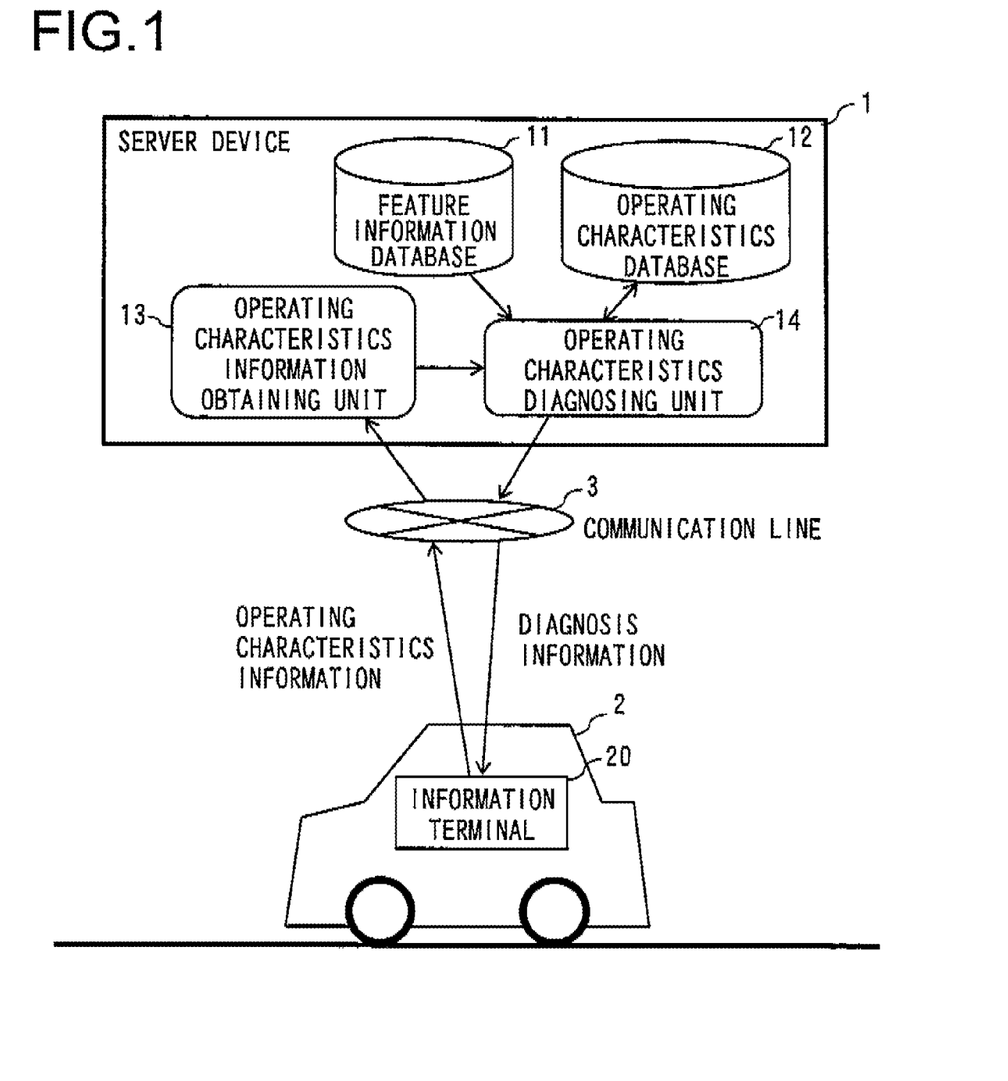
FIG. 1 presents a construction diagram of the operating characteristics diagnosis system according to an embodiment of the present invention.

FIG. 1 presents a construction diagram of the operation characteristics diagnosis system according to an embodiment of the present invention. The operating characteristics diagnosis system shown in FIG. 1 includes a server device 1 and an information terminal 20 mounted on a vehicle 2 that are connected with each other via a communication line 3 such as a portable phone line or the internet. The server device 1 includes a feature information database 11, an operating characteristics database 12, an operating characteristics information obtaining unit 13 and an operating characteristics diagnosing unit 14.

The information terminal 20 is capable of detecting various types of information about the operating characteristics of the vehicle 2 as operating characteristics information. This device may be realized by, for instance, an electronic control unit (ECU) or a navigation device. As an alternative, a portable information terminal such as a smartphone or a tablet personal computer (tablet PC) may be used as the information terminal 20. This may be achieved by executing a predetermined application at the portable information terminal while it is taken aboard in the vehicle 2.

The information terminal 20 detects various type of information including, for instance, the driving tendency of the driver of the vehicle 2, the state or condition of the vehicle 2, and the traveling position of the vehicle 2 as operating characteristics information. The information about the driving tendency includes, for instance, acceleration and deceleration, operation of the steering, and inter-vehicular distance. The information about the state or condition of the vehicle 2 includes, for instance, tire pressure, mileage, and state of seat belt usage. The information about the traveling position of the vehicle 2 includes, for instance, information about longitude and latitude. The contents of the information are exemplary and any desired information may be detected as operating characteristics information.

The vehicle 2 and the information terminal 20 may include as mounted thereon various types of sensors for detecting the operating characteristics information, for instance, a global positioning system (GPS) sensor, an acceleration sensor, and a gyro sensor. Note that when a sensor mounted on the vehicle 2 is used, the results of detection by the sensor are transmitted from the vehicle 2 to the information terminal 20. The operating characteristics information detected by the information terminal 20 is transmitted to the operating characteristics information obtaining unit 13 of the server device 1 via the communication line 3.

Note that in the case that the vehicle 2 is shared by a plurality of drivers, for instance, when the vehicle 2 is jointly owned by a family, the information terminal 20 obtains the operating characteristics information relative to each of the drivers individually. Specifically, when the operation of the vehicle 2 is started, the information terminal 20 determines which one of the plurality of drivers registered for the vehicle 2 drives the vehicle 2. It transmits the result of determination together with the obtained operating characteristics information to the server device 1. A specific method of determining the driver will be explained later.

The operating characteristics information obtaining unit 13 receives the operation characteristics information transmitted from the information terminal 20 to obtain the operating characteristics information relative to the driver who is currently driving the vehicle 2. Then, it outputs the obtained operating characteristics information to the operating characteristics diagnosing unit 14.

In the feature information database 11, there is recorded the feature information about the features of each of the drivers registered for the vehicle 2 in the server device 1 in advance. The feature information includes information about attribute, driving career, resident area, and duration of residence and so on of each of the drivers. The information about the attribute of each of the drivers include, for instance, name, age, sex, vehicle type of the vehicle 2, and intended use of the vehicle 2 and so on. The information relative to the driving career of each of the drivers includes, for instance, the number of years of driving, a driving record, and an applicable grade of auto insurance and so on. Note that the contents of the information are exemplary and any other desired information may be registered as the feature information in the server device 1.

The operating characteristics diagnosing unit 14 specifies a driver of the vehicle 2 and obtains the feature information of the specified driver from the feature information database 11. Then, based upon the feature information from the feature information database 11 and the operating characteristics information from the operating characteristics information obtaining unit 13, it performs diagnosis of the operating characteristics relative to the driver who is currently driving the vehicle 2. The result of the diagnosis of the operating characteristics is output from the operating characteristics diagnosing unit 14 to the operating characteristics database 12 and recorded at the operating characteristics database 12.

The operating characteristics database 12 records the information relative to the result of the diagnosis of the operating characteristics performed by the operating characteristics diagnosing unit 14 relative to each of the drivers of the vehicle 2.

In addition, the operating characteristics diagnosing unit 14 is able to perform diagnosis of the operating characteristics of the vehicle 2 giving a comprehensive consideration of the operating characteristics of each of the drivers who share the vehicle 2 in response to a request from the information terminal 20. The result of the diagnosis of the operating characteristics of the vehicle 2 is transmitted, together with the result of the diagnosis of the operating characteristics for each of the drivers inclusive of the driver who is currently driving the vehicle 2, as diagnosis information from the operating characteristics diagnosing unit 14 to the information terminal 20 via the communication line 3. Note that a specific method of diagnosing the operating characteristics relative to the driver and the vehicle 2 by the operation characteristics diagnosing unit 14 will be explained later.

Upon receipt of the diagnosis information transmitted from the operating characteristics diagnosing unit 14, the information terminal 20 brings up on display the result of the diagnosis of the operating characteristics based upon the received diagnosis information. Thus, the result of the diagnosis of the operating characteristics relative to each of the drivers of the vehicle 2 and the vehicle 2 is presented to the driver who is currently driving the vehicle 2.

The server device 1 is able to provide the result of diagnosis of the operating characteristics as described above to various users who use the operating characteristics diagnosis system as shown in FIG. 1. In other words, the individual operating characteristics of each of the drivers and the operating characteristics of each vehicle that is used by each of the drivers alone or shared by one user and any other user are diagnosed, so that the results of the diagnoses are provided to each of the users. In addition, the server device 1 may provide the results of diagnoses relative to each of the users and each of the vehicles to other system users, for instance, insurance companies, car manufacturers, and driving schools and so on. The system users can use the results of the diagnoses relative to each of the users and each of the vehicles for calculating auto insurance prices and for aiding safe driving and so on.

Figure 2:
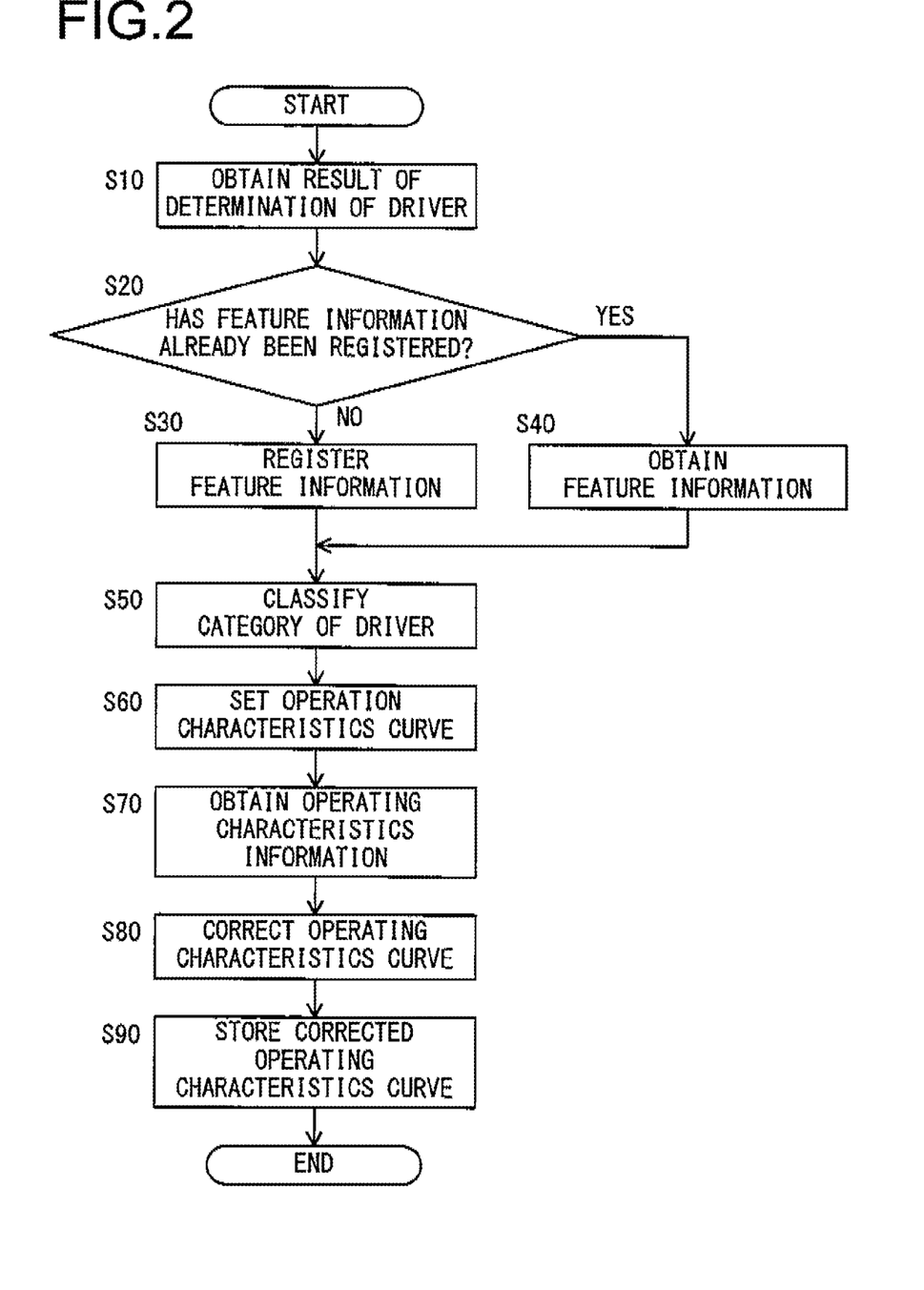
FIG. 2 presents a flowchart illustrating the flow of processing for diagnosing the operating characteristics of the driver.

Next, the contents of processing at the server device 1 are explained in detail. FIG. 2 presents a flowchart illustrating the flow of processing for diagnosing the operating characteristics of the driver. The processing shown in this flowchart is executed at the server device 1 by the operating characteristics information obtaining unit 13 and the operating characteristics diagnosing unit 14 when the operation of the vehicle 2 is started.

In step S10, the operating characteristics diagnosing unit 14 obtains the result of the determination of the driver of the vehicle 2 from the information terminal 20. Then, the information terminal 20 is able to determine or identify the driver based upon, for instance, the user ID input by the driver. As an alternative, the driver may be automatically determined at the information terminal 20. For instance, the determination may be performed by biometric authentication using features such as face, fingerprint, and vein pattern on the hand based upon a captured image of the driver or the determination may be performed based upon the driving tendency of the driver. Alternatively, the driver may be determined by using an IC card or the like in which a user ID is recorded. In addition, these may be combined in any desired fashion in order to prevent deception of a driver. Note that based upon the information from the information terminal 20, the driver of the vehicle 2 may be determined at the server device 1. For instance, the operating characteristics information as described earlier may be obtained by the operation characteristics information obtaining unit 13 and based on the obtained information, the tendency of the driver is judged, from which the driver can be determined.

In step S20, the operating characteristics diagnosing unit 14 makes a decision relative to the driver represented by the result of the determination obtained in step S10 as to whether or not the feature information of the driver has already been registered. If the feature information of the driver has already been registered and recorded at the feature information database 11, the process proceeds to step S40. If, on the other hand, it has not been registered yet, the process proceeds to step S30.

In step S30, the operating characteristics diagnosing unit 14 registers the feature information of the driver therein. Here, based upon various types of information input by the driver at the information terminal 20, the feature information of the driver is registered and recorded in the feature information database 11 by the method described below.

Figure 3:
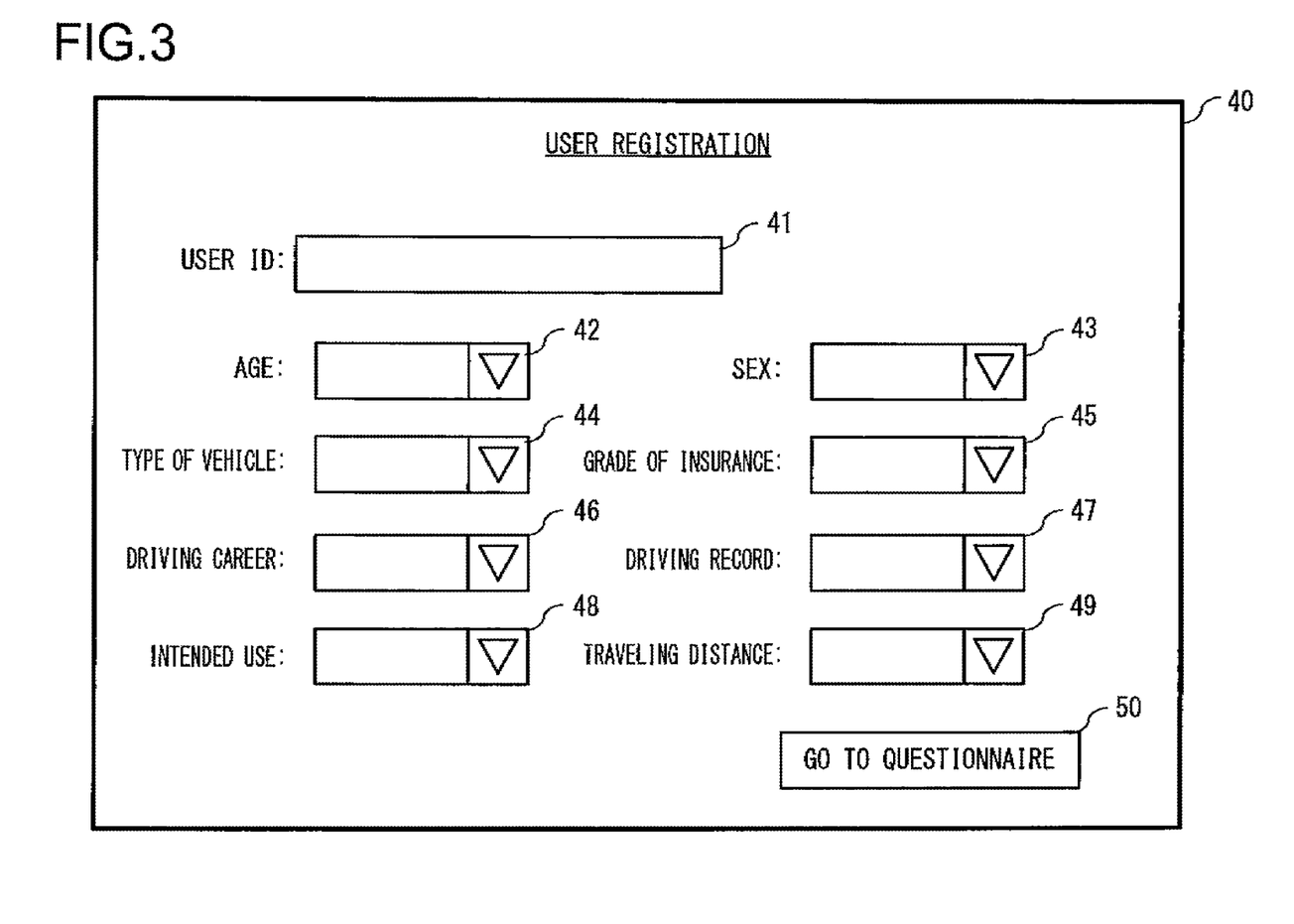
FIG. 3 shows an example of a user registration screen that is brought up on display when the feature information of the driver is to be registered.

FIG. 3 shows an example of the user registration screen brought up on display at the information terminal 20 when the feature information of the driver is registered. At the user registration screen 40, the driver of the vehicle 2 can input information that is required to fill in entry fields 41-49 with an operating member (not shown), for instance, a hardware switch, a touch panel or the like, provided at the information terminal 20. If all the entry fields 41-49 are in an already entered state and the driver selects an enter button 50, the contents of what has been input is settled and the process proceeds to a next screen shown in FIG. 4.

Figure 4:
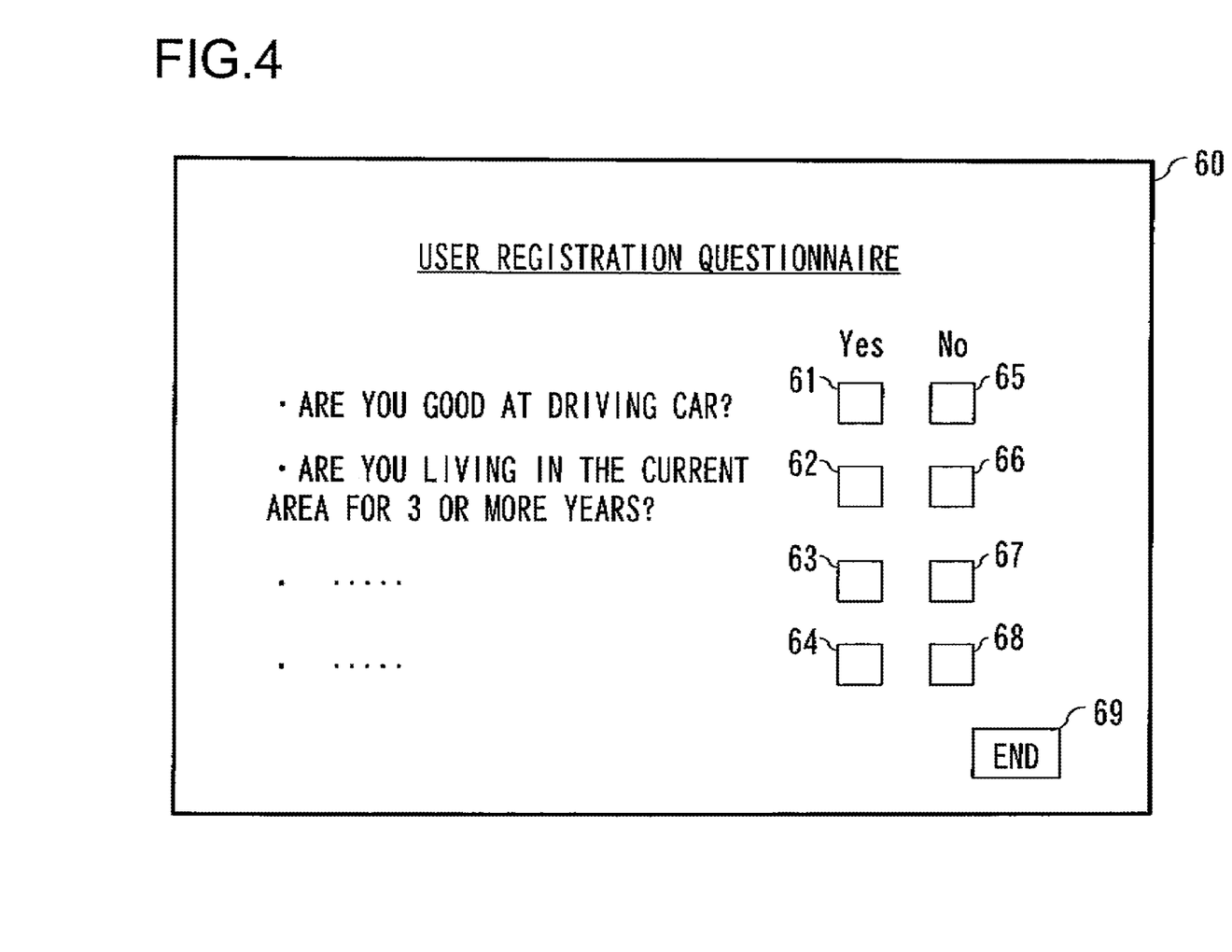
FIG. 4 shows an example of a questionnaire screen.

FIG. 4 shows an example of a questionnaire screen brought up on display next to the one shown in FIG. 3. At the questionnaire screen 60, the driver of the vehicle 2 can select any one of selection buttons 61-64 representing "Yes" or any one of selection buttons 65-68 representing "No" in order to respond to each item of the questionnaire. When the driver selects a termination button 69 after he answered all the items of the questionnaire, the contents of answers at the questionnaire screen 60 together with the contents of what has been input at the previous user registration screen 40 are transmitted from the information terminal 20 to the server device 1. Receipt of these enables the operating characteristics diagnosing unit 14 to register the feature information relative to the driver into the feature information database 11.

Figure 5:
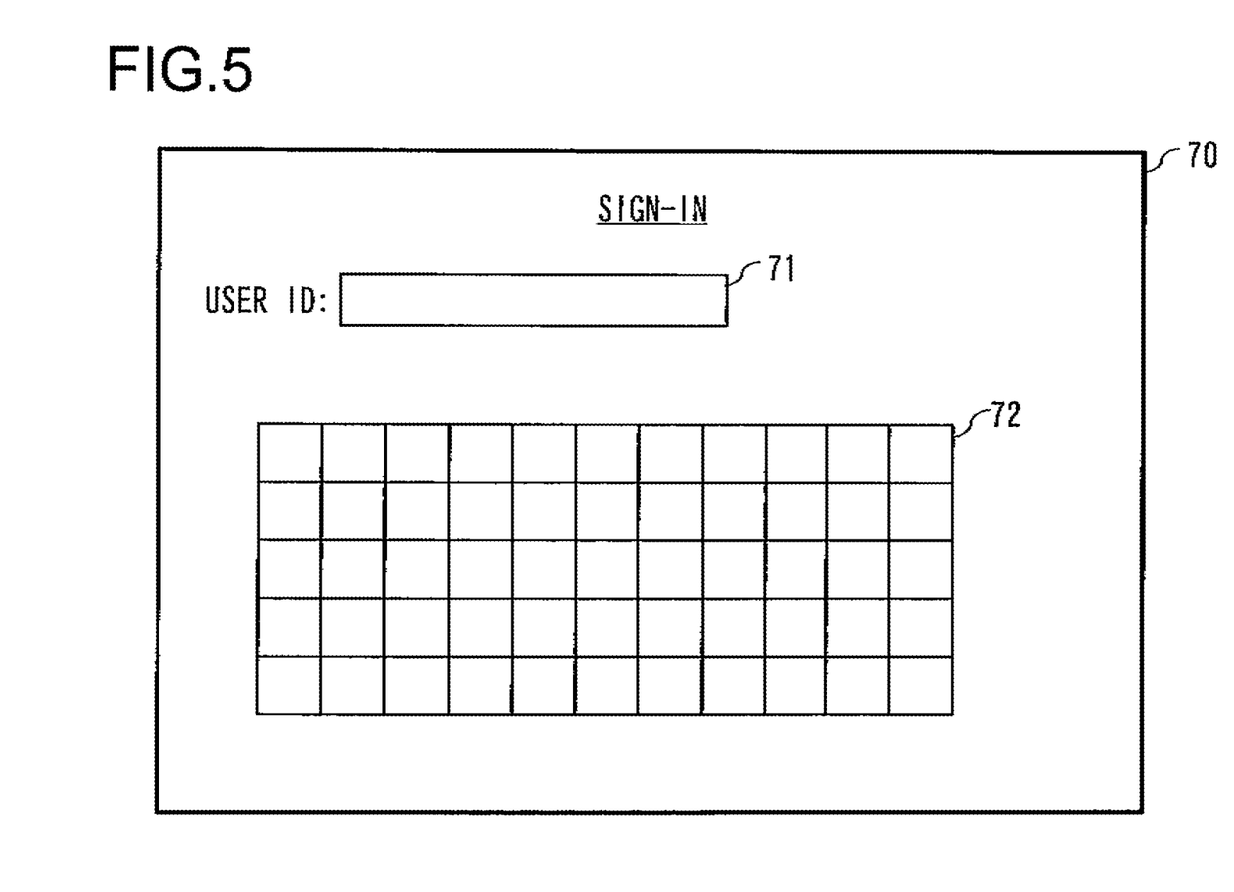
FIG. 5 shows an example of a sign-in screen that is brought up on display when the feature information of the driver has already been registered.

On the other hand, FIG. 5 shows an example of the sign-in screen brought up on display at the information terminal 20 when the feature information of the driver has already been registered. At the sign-in screen 70, the driver of the vehicle 2 selects any one of the keys on a software key board 72 in sequence with the operating member of the information terminal 20 to input the user ID that has been already registered, so that he can start usage of the operating characteristics diagnosing system shown in FIG. 1.

Figure 6:
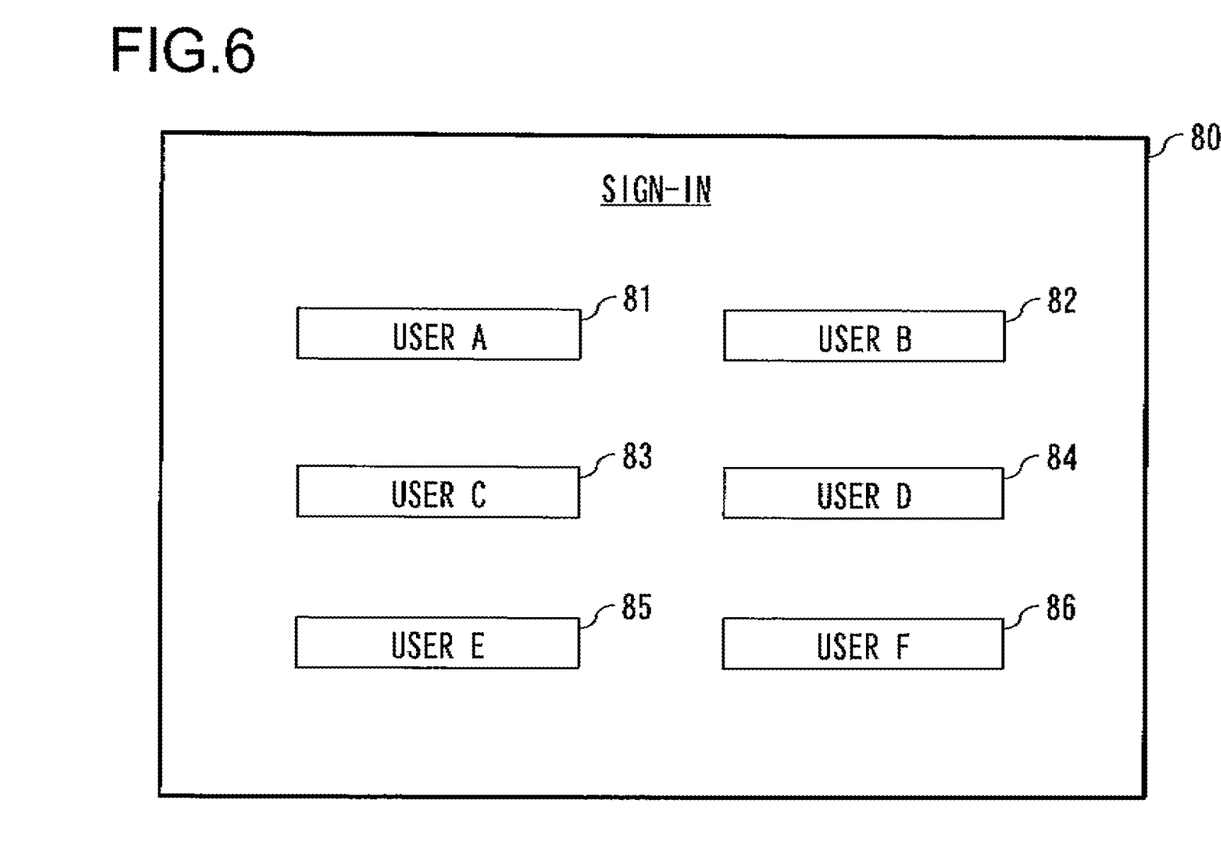
FIG. 6 shows an example of another sign-in screen that is brought up on display when the feature information of the driver has already been registered.

FIG. 6 shows another example of the sign-in screen brought up on display at the information terminal when the feature information of the driver has already been registered. At the sign-in screen 80, the driver of the vehicle 2 selects any one of selection buttons 81-86 with the operating member of the information terminal 20 to select any one of users A-F who have already registered their user ID, so that he can start usage of the operating characteristics diagnosing system shown in FIG. 1.

In step S40, the operating characteristics diagnosing unit 14 obtains the feature information of the driver from the feature information database 11. In this step, the registered characteristic information relative to a specified driver represented by the result of determination obtained in step S10 is read out from the feature information database 11 to obtain the feature information relative to the specified driver.

When the processing in step S30 or step S40 is executed, the operating characteristics diagnosing unit 14 causes the process to proceed to step S50.

In step S50, the operating characteristics diagnosing unit 14 performs category classification of the driver. In this step, based upon the feature information registered in step S30 or the feature information obtained in step S40, the driver is classified into any one of a plurality of categories. As a result, the driver is classified into any one of categories, consisting of, for instance, beginners of driving, experienced persons of driving, or aged persons. Note that the categories referred to herein are exemplary and other category classifications may be adopted. For instance, the category classification may be performed based upon indices of sex, age, and driving tendency. In this case, a plurality of category classifications may be used in combination.

In step S60, the operating characteristics diagnosing unit 14 sets an operating characteristics curve in correspondence to the category of the driver classified in step S50. This is to diagnose (or predict) future operation characteristics by setting an operating characteristics curve in correspondence to the category relative to each of the drivers. In this step, the operating characteristics curve in correspondence to the category of the driver can be set, for instance, by the method explained below.

Figure 7A:
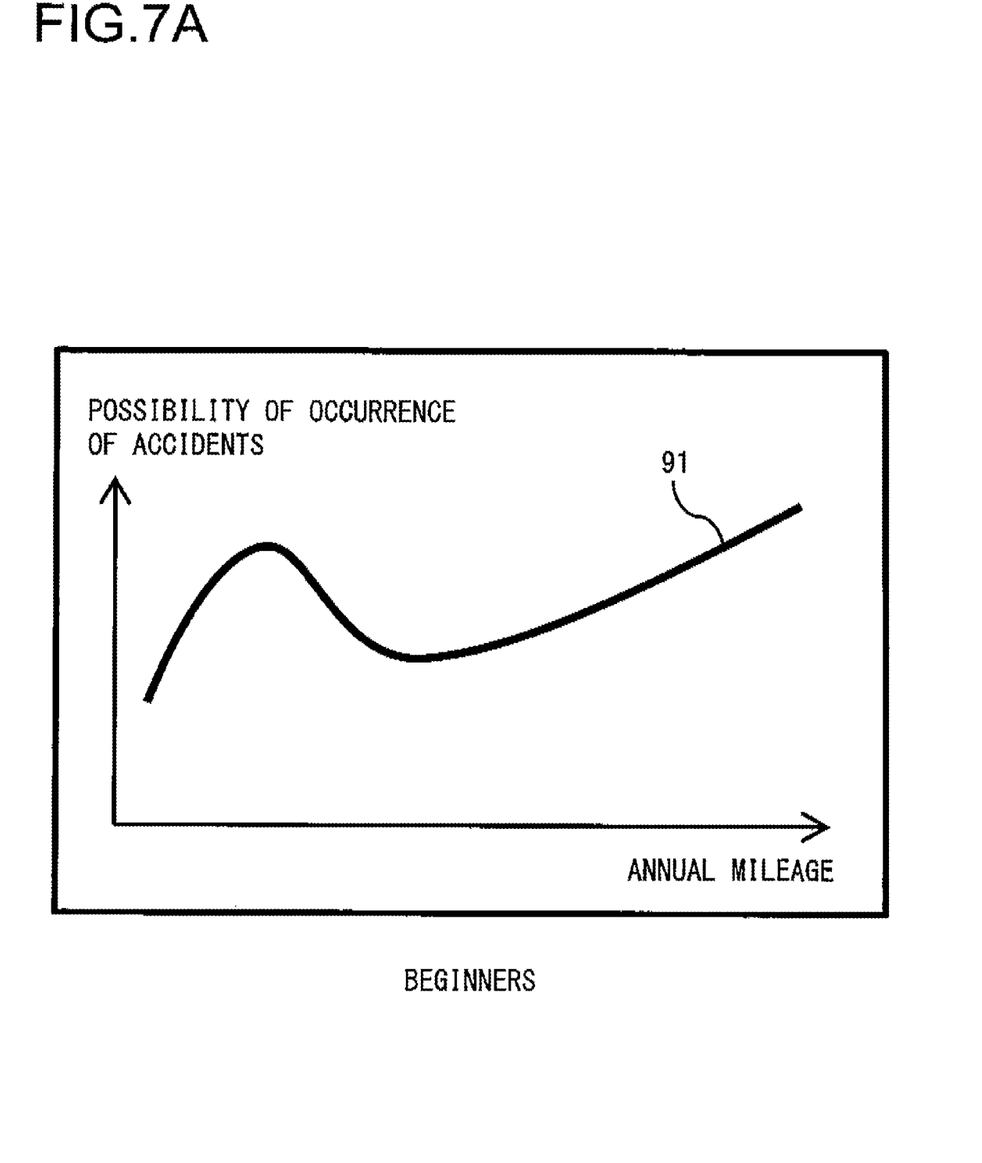
FIGS. 7A through 7C present diagrams each showing an example of configuration of an operating characteristics curve in correspondence to the category of the driver, with FIG. 7A for beginners, FIG. 7B for experts, and FIG. 7C for aged persons.

FIGS. 7A through 7C present each a diagram showing an example of configuration of an operating characteristics curve in correspondence to the category of the driver. An operating characteristics curve 91 shown in FIG. 7A is an example of the operating characteristics curve set when the driver belong to the category of beginners. The operating characteristics curve 91 indicates that the possibility of occurrence of accidents decreases as the annual mileage increases in a certain range with reflecting the tendency of occurrence of accidents by the beginners.

Figure 7B:
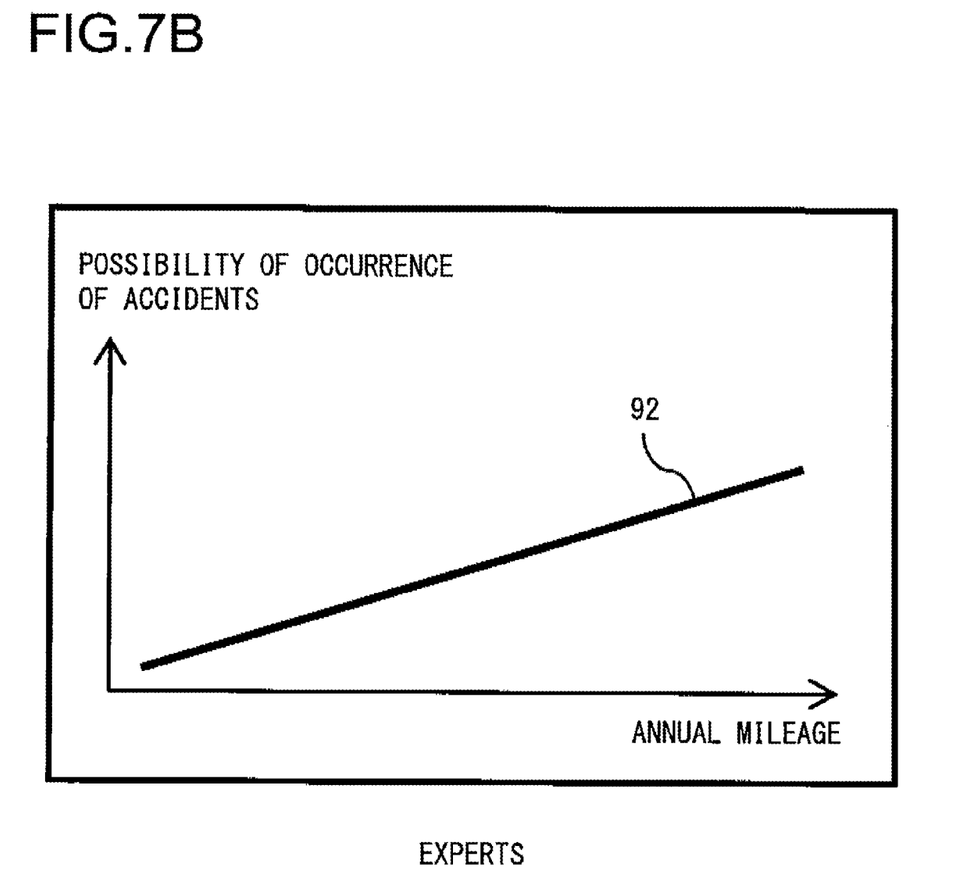

An operating characteristics curve 92 shown in FIG. 7B is an example of the operating characteristics curve set in the case where the driver belongs to the category of experts. The operating characteristics curve 92 indicates that the possibility of occurrence of accidents increases at a constant rate as the annual mileage increases, with reflecting the tendency of the occurrence of accidents by the experts.

Figure 7C:
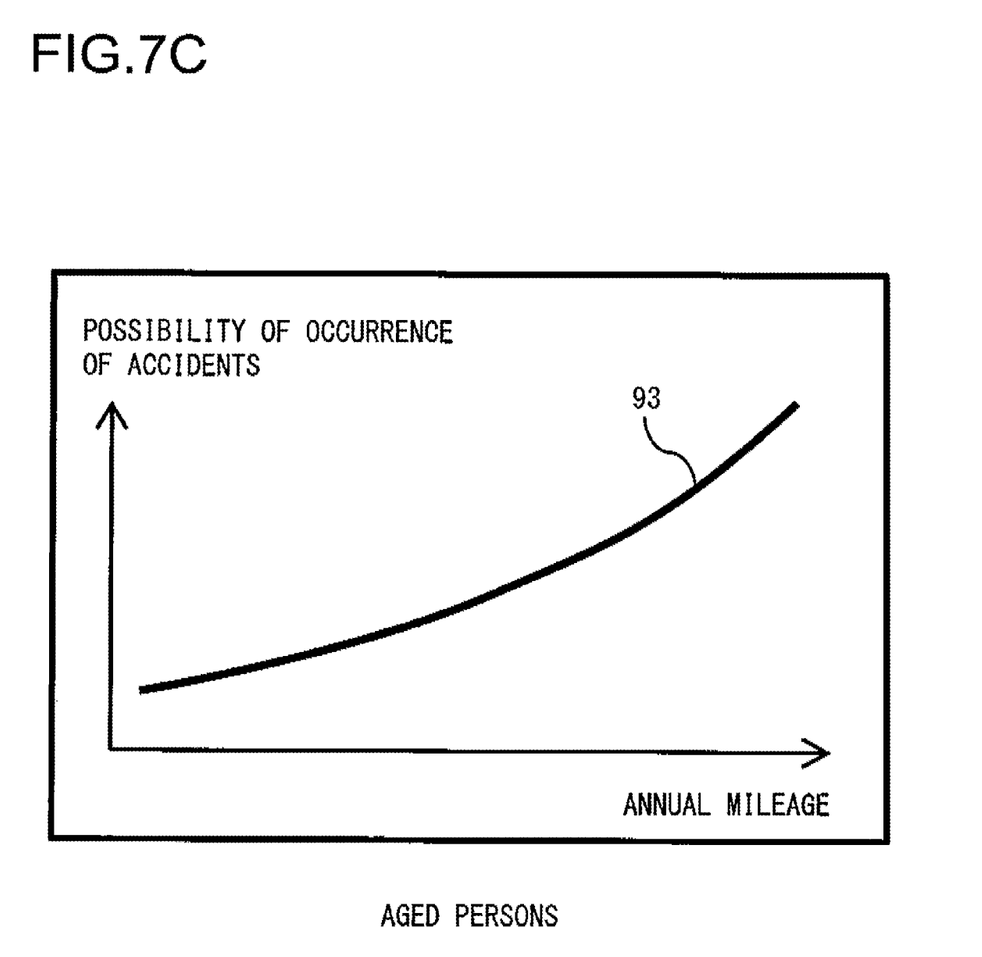

An operating characteristics curve 93 shown in FIG. 7C is an example of the operating characteristics curve set in the case where the driver belongs to the category of aged persons. The operating characteristics curve 93 indicates that the possibility of occurrence of accidents increases at an accelerated rate as the annual mileage increases, with reflecting the tendency of occurrence of accidents by aged persons.

Note that the operating characteristics curves 91-93 are exemplary and other operating characteristics curves may be set. In step S60, the operating characteristics diagnosing unit 14 can set various operating characteristics curves in correspondence to the category classification of the driver.

In step S70, the operating characteristics information obtaining unit 13 obtains the operating characteristics information transmitted from the information terminal 20. In this step, the information described earlier detected at the information terminal 20 is obtained as operating characteristics information and the obtained information is output to the operating characteristics diagnosing unit 14.

In step S80, the operating characteristics diagnosing unit 14 corrects the operating characteristics curve set in step S60 in correspondence to the operating characteristics of the driver. In this step, the operating characteristics curve set as described above is corrected based upon the feature information registered in step S30 or the feature information obtained in step S40 and upon the operating characteristics information obtained in step S70.

Figure 8:
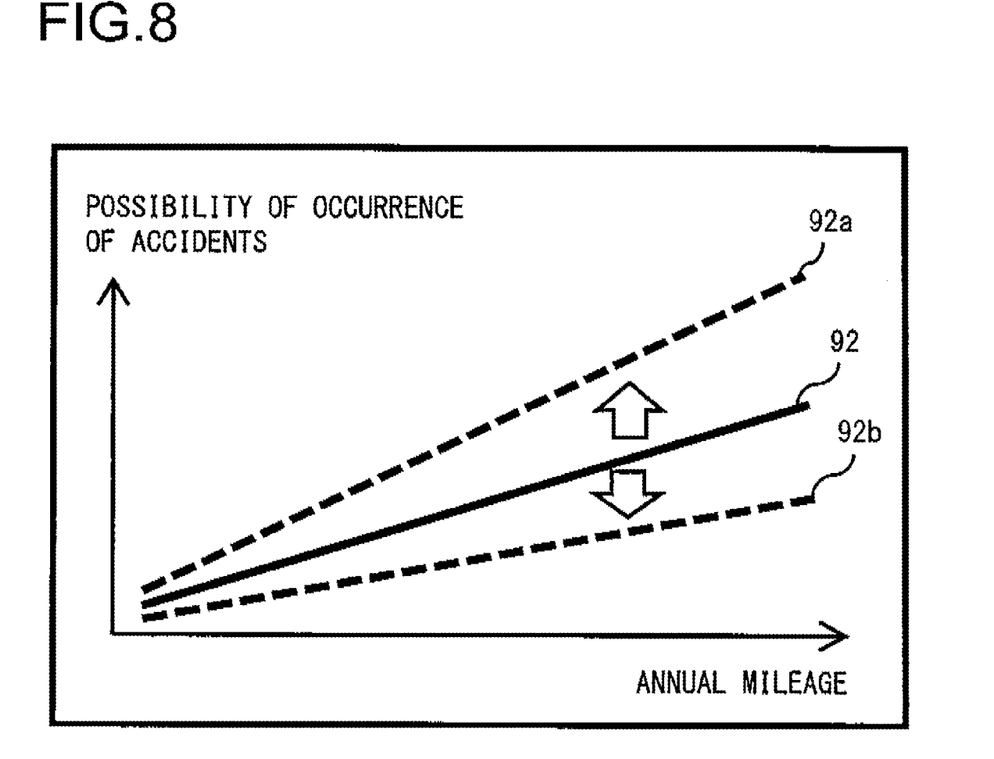
FIG. 8 presents a diagram showing an example of correction of the operating characteristics curve.

FIG. 8 presents a diagram showing an example of correction of the operating characteristics curve. For instance, when the operating characteristics curve 92 described above is set, it is corrected to be shifted upwards or downwards as shown in FIG. 8 in correspondence to the operating characteristics of the driver.

For instance, in the case where it is judged from the feature information that the driver experienced many accidents, or in the case where it is judged from the operating characteristics information that the driver has a tendency of performing dangerous driving such as abrupt acceleration or deceleration, sudden turn and the like, the operating characteristics curve 92 is corrected so as to be shifted upwards. In addition, in the case where it is judged from the information about the state or condition of the vehicle contained in the operating characteristics information that the state or condition of the vehicle 2 is inappropriate for safe driving or it is judged from the information about the traveling position of the vehicle contained in the operating characteristics information that the vehicle 2 is traveling in an accident-prone area, the operating characteristics curve 92 is corrected so as to be shifted upwards.

On the other hand, in the case where it is judged, for instance, from the feature information that the driver is resident in the area where the vehicle 2 is traveling for a long period of time or in the case where it is judged from the operating characteristics information that the driver has a tendency of performing safe driving, the operating characteristics curve 92 is corrected so as to be shifted downwards.

By performing correction of the operating characteristics curve 92 as described above, for instance, an operating characteristics curve 92*a* or 92*b* is obtained. In this manner, it is possible to make a diagnosis (prediction) of future operating characteristics relative to the respective drivers by correcting the operating characteristics curve relative to the respective drivers.

In step S90, the operating characteristics diagnosing unit 14 records the operating characteristics curve corrected in step S80 in the operating characteristics database 12. After executing the processing in step S90, the operating characteristics diagnosing unit 14 terminates the processing as shown in the flowchart of FIG. 2.

The server device 1 executes the above-described processing as often as various drivers drive the vehicle 2 to perform diagnosis of the operating characteristics relative to each of the drivers of the vehicle 2. In other words, based upon the feature information of each of the drivers, the drivers are classified into any one of the plurality of categories and an operating characteristic curve in correspondence to the classified category is set relative to each of the drivers. Then, based upon the feature information and the operating characteristics information of each of the drivers, the set operating characteristics curve of each of the drivers is corrected. With these measures, the diagnosis of the operating characteristics of each of the drivers is performed and the operating characteristics curve after the correction is recorded in the operating characteristic database 12 as the result of the diagnosis of the operating characteristics of each of the drivers.

Figure 9:
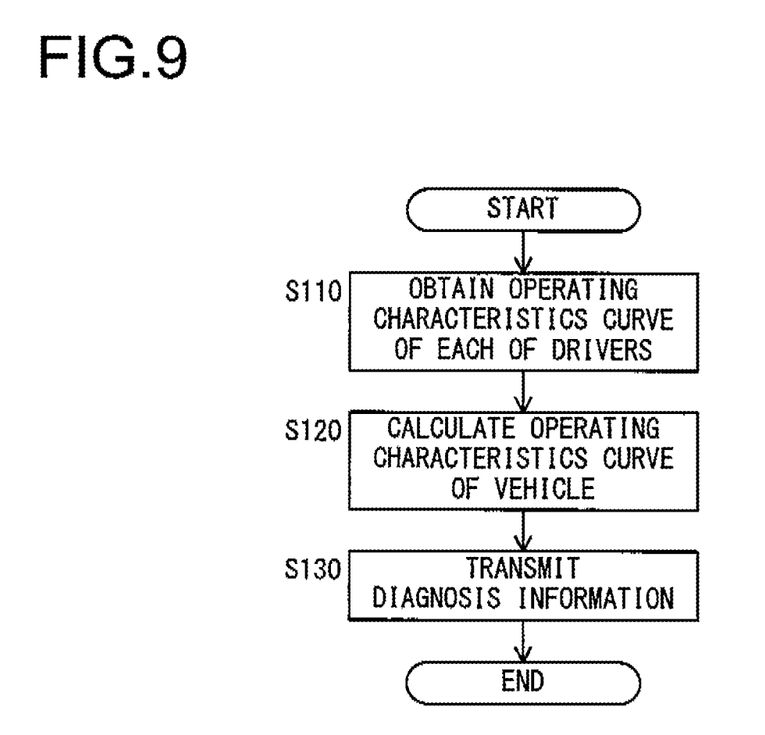
FIG. 9 presents a flowchart illustrating the flow of processing for diagnosing the operating characteristics of the vehicle based upon the result of the diagnosis of the operating characteristics of the driver.

FIG. 9 presents a flowchart illustrating the flow of processing for diagnosing the operating characteristics of the vehicle 2 based on the result of diagnosis of the operating characteristics of the driver. The processing shown in the flowchart is executed by the operating characteristics diagnosing unit 14 at the server device 1 in response to the request of operating characteristics diagnosis from the information terminal 20 or other information terminal.

In step S110, the operating characteristics diagnosing unit 14 obtains the operating characteristics curve of each of the drivers registered as a driver of the vehicle 2 from the operating characteristics database 12. In this step, the operation characteristic curve is obtained by reading out the operating characteristics curve of each of the drivers of the vehicle 2 recorded in step S90 in FIG. 2.

In step S120, the operating characteristics diagnosing unit 14 calculates the operating characteristics curve of the vehicle 2 based upon the operating characteristics curve of each of the drivers obtained in step S110. In this step, a comprehensive operating characteristics curve of the vehicle 2 is calculated by superimposing the obtained operating characteristics curves of the drivers.

Figure 10:
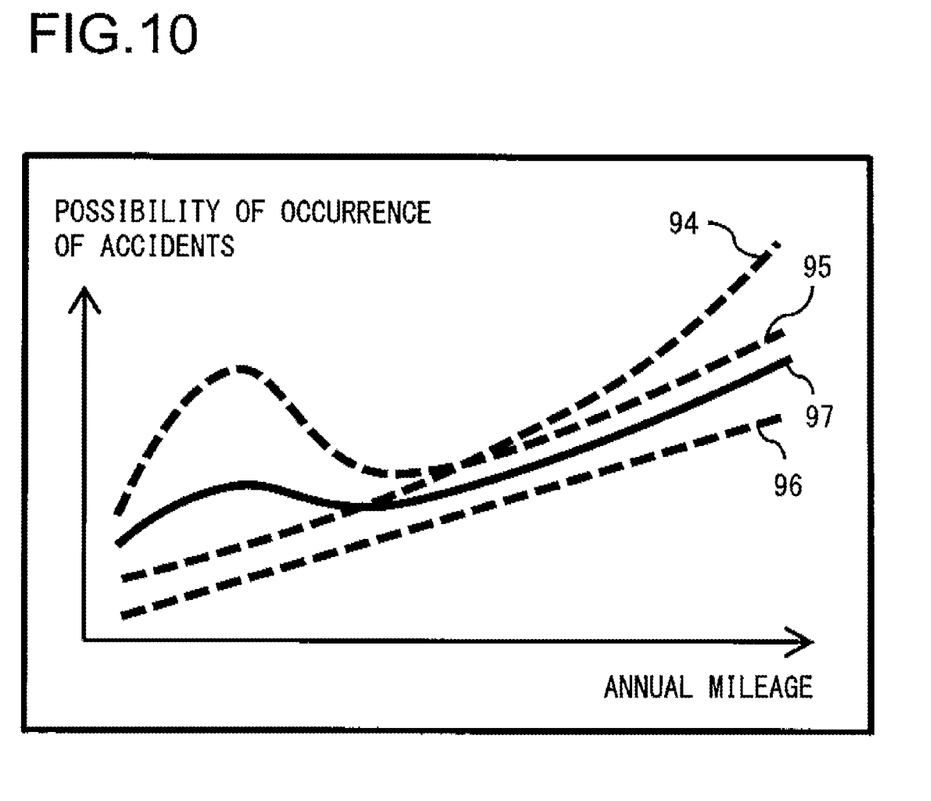
FIG. 10 presents a diagram showing an example of calculation of the operating characteristics curve of the vehicle.

FIG. 10 shows an example of calculation of the operating characteristics curve of the vehicle 2. It is assumed that for the vehicle 2, for instance the operating characteristics curves 94, 95 and 96 as shown in FIG. 10 are recorded relative to the respective drivers and that the operating characteristics curves 94-96 are obtained in step S110. In this case, the operating characteristics curve 97 of the vehicle 2 can be calculated by adding the operating characteristics curves 94-96 as weighted in correspondence to time of usage and traveling distance of the vehicle 2 by each of the drivers.

The server device 1 can perform diagnosis of the operating characteristics of the vehicle 2 by calculating the operating characteristics curve of the vehicle 2 based upon the operating characteristics curve of each of the drivers described earlier.

In step S130, the operating characteristics diagnosing unit 14 transmits diagnosis information indicating the result of diagnosis of the operating characteristics to the information terminal 20 or any other information terminals from which diagnosis of the operating characteristics was requested. In this step, the information of the operating characteristics curve of each of the drivers obtained in step S110 and the information of the operating characteristics curve of the vehicle 2 calculated in step S120 are transmitted as diagnosis information. After the processing in step S130 is executed, the operating characteristics diagnosing unit 14 terminates the processing that is shown in the flowchart of FIG. 9.

The information terminal 20 or other information terminals that received the diagnosis information described above bring up on display the operating characteristics curves 94-96 in FIG. 10 as the result of diagnosis of the operating characteristics of each of the drivers. Also it brings up on display the operating characteristics curve 97 as the comprehensive result of diagnosis of the operating characteristics of the vehicle 2. On this occasion, it is preferred to adopt a configuration that makes it possible to discern which driver, who is currently driving the vehicle 2, corresponds to which operating characteristics curve. In addition, a configuration may be adopted in which the current traveling distance is brought up on display on each operating characteristics curve to notice a currently expected possibility of occurrence of accidents to the driver. Also, a configuration may be adopted in which an advice about driving operation is presented to the driver based upon individual operating characteristics information obtained from the vehicle. In this manner, the result of diagnosis of the operating characteristics relative to each of the drivers of the vehicle 2 and of the operating characteristics relative to the vehicle 2 can be presented to the driver.

According to the embodiment described earlier, the following operations and advantageous effects can be obtained.

(1) The server device 1 obtains the operating characteristics information about the operating characteristics of the vehicle 2 through the operating characteristics information obtaining unit 13. In addition, the operating characteristics of the vehicle 2 are diagnosed by the operating characteristics diagnosing unit 14 based upon the feature information relative to the feature of the driver of the vehicle 2 registered in advance in the feature information database 11 of the server device 1 and the operating characteristics information obtained from the vehicle 2. With this measure, the diagnosis of the operating characteristics of the vehicle 2 can be achieved, with the characteristics of each of the drivers who drive the vehicle 2 being reflected.

(2) In the case where the vehicle 2 is shared by a plurality of drivers, the server device 1 causes the operating characteristics diagnosing unit 14 to diagnose the operating characteristics relative to each of the drivers of the vehicle 2 and diagnose the operating characteristics of the vehicle 2 based upon the result of diagnosis of the operating characteristics of each of the drivers. With this measure, the diagnosis of the operating characteristics of the vehicle 2 can be achieved, with the characteristics of each of the drivers who drive the vehicle 2 being reflected.

(3) The operating characteristics information obtaining unit 13 obtains the operating characteristics information relative to the respective drivers of the vehicle 2 (step S70). On the other hand, the operating characteristics diagnosing unit 14 registers or obtains the feature information of each of the drivers of the vehicle 2 (steps S30 and S40) and classifies each of the drivers into any one of a plurality of categories based on the registered or obtained feature information (step S50). Then, it sets an operating characteristics curve for each of the drivers in correspondence to the category to which each of the drivers was classified (step S60) and corrects the set operating characteristics curve based upon the feature information and the operating characteristics information of each of the drivers (step S80). Based upon the operating characteristics curve of each of the drivers thus corrected, the operating characteristics diagnosing unit 14 calculates the operating characteristics curve of the vehicle 2 (step S120) and diagnoses the operating characteristics of the vehicle 2. With these measures, it becomes possible to predict the operation characteristics in future but not the diagnosis of the operating characteristics in past based upon the actual driving operations and so on, so that the operating characteristics of the vehicle 2 can be appropriately diagnosed.

(4) Note that the feature information recorded in the feature information database 11 preferably includes information relative to at least one of attribute, driving career, resident area and duration of residence of the driver. In addition, the operating characteristics information obtained by the operating characteristics information obtaining unit 13 preferably includes information relative to at least one of the driving tendency of the driver, the state or condition of the vehicle 2 and the traveling position of the vehicle 2. With these measures, the category classification of the drivers in step S50, the correction of the operation characteristic curve in step S80 and the like can be appropriately executed at the operating characteristics diagnosing unit 14 based upon the information described above. As a result, the operating characteristics of the vehicle 2 can be diagnosed accurately.

(5) In step S10, the operating characteristics diagnosing unit 14 can obtain the result of determination of the driver of the vehicle 2 who is determined at the information terminal 20 or the server device 1 based upon the captured image or the operating characteristics information of the driver. With these measures, the driver can be automatically determined without inputting user ID or the like by the driver.

(6) The operating characteristics diagnosing unit 14 transmits the diagnosis information indicating the result of diagnosis of the operating characteristics to the information terminal 20 or other information terminals from which diagnosis of operating characteristics is requested (step S130). The information terminal 20 or other information terminals that receive the diagnosis information presents the result of diagnosis of the operating characteristics of the vehicle 2 to each of the drivers by presenting to each of the drivers the operating characteristics curve relative to each of the drivers corrected in step S80 and the operating characteristics curve calculated in step S120. With these measures, the result of the diagnosis on the operating characteristics relative to each of the drivers of the vehicle 2 and relative to the vehicle 2 can be presented to the driver in a manner easy to understand.

The present invention is not limited to the above-mentioned embodiment and variation. The above described embodiments are exemplary and various modifications can be made without departing from the scope of the invention.

What is claimed is:

1. A method of diagnosing operating characteristics of a vehicle by a server device, the method comprising:
   obtaining, by the server device, operating characteristics information relative to the operating characteristics of the vehicle, wherein the operating characteristics information is detected by at least one sensor mounted to the vehicle;
   determining, by the server device, a driver of the vehicle based upon a captured image of the driver;
   obtaining, by the server device, feature information relative to a feature of the driver of the vehicle registered in advance, wherein the feature information is stored in a database in association with the driver; and
   diagnosing the operating characteristics of the vehicle based upon the feature information and the operating characteristics information, including
   classifying the driver into one of a plurality of categories based upon the feature information;
   setting an operating characteristics curve corresponding to the classified category of the driver;
   correcting the set operating characteristics curve based upon the feature information and the operating characteristics information; and
   diagnosing the operating characteristics of the vehicle based upon the corrected operating characteristics curve.

2. A method of diagnosing operating characteristics according to claim 1, wherein:
   the vehicle is shared by a plurality of drivers; and
   the server device:
   diagnoses the operating characteristics of the vehicle for each of the drivers; and
   diagnoses the operating characteristics of the vehicle based upon a result of the diagnosis of the operating characteristics of each of the drivers.

3. A method of diagnosing operating characteristics according to claim 1, wherein:
   the vehicle is shared by a plurality of drivers; and
   the server device:
   classifies each of the drivers into any one of the plurality of the categories based upon the feature information of each of the drivers of the vehicle;
   sets an operating characteristics curve corresponding to the classified category of each of the drivers for each of the drivers;
   corrects the set operating characteristics curve of each of the drivers based upon the feature information and the operating characteristics information of each of the drivers; and
   diagnoses the operating characteristics of the vehicle based upon the corrected operating characteristics curve of each of the drivers.

4. A method of diagnosing operating characteristics according to claim 1, wherein:
   the feature information includes at least one of a plurality of pieces of information about attribute, driving career, resident area and duration of residence of the driver; and
   the operating characteristics information includes at least one of a plurality of pieces of information about a driving tendency of the driver, a condition or state of the vehicle and a traveling position of the vehicle.

5. A method of diagnosing operating characteristics according to claim 1, wherein
   the result of diagnosis of the operating characteristics of the vehicle is presented to the driver.

6. A method of diagnosing operating characteristics according to claim 3, wherein
   the corrected operating characteristics curve of each of the drivers and the result of diagnosis of the operating characteristics of the vehicle are presented to each of the drivers.

* * * * *